(No Model.)

J. D. CURTIS.
BARBED WIRE.

No. 494,325. Patented Mar. 28, 1893.

Section B.

Witnesses
L. C. Hills
Avellasick

Inventor
John D. Curtis
By his Attorney Marcellus Bailey

UNITED STATES PATENT OFFICE.

JOHN D. CURTIS, OF WORCESTER, MASSACHUSETTS.

BARBED WIRE.

SPECIFICATION forming part of Letters Patent No. 494,325, dated March 28, 1893.

Application filed November 2, 1892. Serial No. 450,795. (No model.)

*To all whom it may concern:*

Be it known that I, JOHN D. CURTIS, a citizen of the United States, residing at Worcester, in the county of Worcester and Commonwealth of Massachusetts, have invented certain new and useful Improvements in Barbed Wire; and I do hereby declare that the following is a full, clear, and exact description thereof, which, in connection with the drawings making a part of this specification, will enable others skilled in the art to which my invention belongs to make and use the same.

The object of my invention is to produce an improved barb having four projecting points, by using to form each barb, two wires, non-circular, but flat on one side, or half round in cross section, so wrapped about the fence wire that each of the two wires forming one of the two members of the completed barb shall securely lock in place the other member of the barb.

Heretofore, the particular style of four-point barbed wire, to which my improvement relates, has been made by using two round wires to form the two members of each barb. In order to secure them in their relative positions so that their rotation upon the fence wire would be prevented, as far as possible, it has been necessary to wrap the barb wires several times about the fence wire to secure the necessary amount of friction, but, under pressure, the two members of the barb turning upon the fence strand as an axis would frequently shut together, the convolutions of the two members of the barb having the same pitch, so that when this occurred there would be, in place of the four-point barb, in effect, two groups of barbs of two points each. The peculiar efficiency of the four-point barb is thus largely destroyed. Practically this condition occurs quite frequently, as the barbs, when the fencing is wound upon spools for transportation, in process of manufacture, are subjected to considerable pressure, and in transportation frequently receive severe blows. Another serious objection to this form of barb, as at present made, is found in its excessive weight, resulting from the size and length of the barb wires necessarily used in its construction. My improved barb obviates all these defects, its members being securely locked in place upon the fence wire, and being less than half the weight of any four-point barb made of two wires, heretofore manufactured, and not heavier than most of the styles of two-point barbed wire upon the market.

Figure 5:
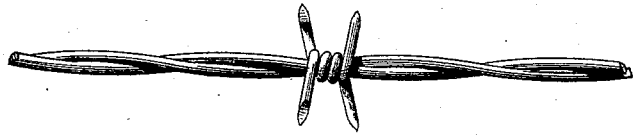
Figure 6:
Figure 7:
Figure 1:
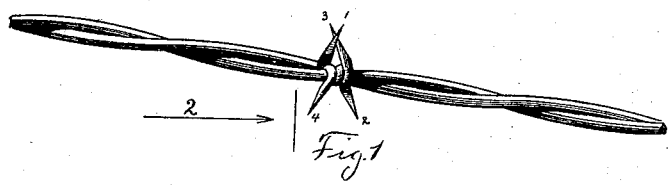
Figure 2:
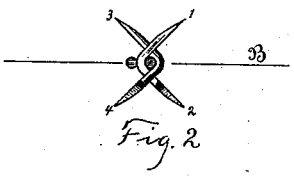
Figure 3:
Figure 4:
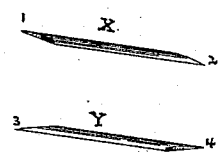

In the drawings, Figure 1 is a perspective view of my improved barb. Fig. 2 is an end view of the barb, looking in the direction of the arrow "2," Fig. 1. Fig. 3 is a sectional view through the line B, Fig. 2, showing the two main strands of the fence, and the barb wires in cross-section as they appear when wrapped about one of the main strands of the fencing, and overlapping each other. Fig. 4 represents the two barb wires $x$ and $y$ composing the two members of the barb when wrapped about the fence wire. Fig. 5 is a view of this style of barb as heretofore made. Fig. 6 is a view of the barb as heretofore made, with the two members of the barb shut together as above described. Fig. 7 is a sectional view of the barb wires when wrapped about the fence wire, as in Fig. 5, corresponding to the view of my improved barb, shown in Fig. 3.

In Fig. 1 the points 1 and 2 are opposite ends of one of the two wires $x$ forming one of the members of the completed barb, and 3 and 4 are opposite ends of the other of the two wires $y$ forming the other member of the completed barb.

In making the barb, the wires of which it is composed are so wrapped around the main strand of the fencing that when the barb is completed the part of the barb wire $x$ toward the end 1, overlaps and has a bearing upon the barb wire $y$, and the part of barb wire $y$ toward the end 3 overlaps and has a bearing upon barb wire $x$, and similarly the parts of $x$ and $y$ toward the points 2 and 4 are supported in the same manner, so that neither can be rotated upon the main wire of the strand independent of the other, thus forming in effect one barb with four points, each point being in line practically, with one of the remaining three points, and at right angles with the other two.

Another great advantage in my improved barb is that it is very light, not only because the barb wire is smaller in section, but because a much shorter wire may be used for the barb, both by reason of the smaller section and because the interlocking of the two members of the barb enables me to secure the barb firmly upon the main wire of the fencing with a smaller number of wraps than would otherwise be feasible. The great advantage resulting becomes apparent when it is appreciated that in a four-strand fence one mile long, with the barbs three inches apart, there is a saving of two hundred and fourteen pounds,—say fifteen per cent., in using my improved barb.

I can use in constructing my improved barb, two wires of any form in cross-section, provided that one side of each barb wire is sufficiently flat so that each member of the barb may overlap and rest upon the other member of the barb sufficiently to produce the desired effect of interlocking the two members of the barb.

In practice I prefer to use a wire half round in cross-section, each of the two members of the barb being wrapped one and one-quarter times around the main wire, although I do not confine myself to any particular number of wraps.

My improved barb may be used in combination with a single wire, but in practice I prefer to use a cable wire of two strands, the barb being wrapped around one of them.

Having thus described my invention, what I claim as new, and desire to secure by Letters Patent, is—

1. In combination with a fence wire, a four-pointed barb, made of wires non-circular in cross-section, the two members of the barb being wrapped around the main fence wire so that the wrapped portion of each member shall partially overlap or rest upon the other, whereby the two members of the barb are firmly interlocked, substantially as described.

2. In combination with a fence wire, a four-pointed barb, made of wires half round in cross-section, the two members of the barb being wrapped around the main fence wire, so that the wrapped portion of each member shall partially overlap or rest upon the other whereby the two members of the barb are firmly interlocked, substantially as described.

JOHN D. CURTIS.

Witnesses:
C. G. WASHBURN,
R. M. WASHBURN.